United States Patent [19]

Steinmetz et al.

[11] Patent Number: 5,772,824
[45] Date of Patent: Jun. 30, 1998

[54] PROCESS AND MEANS FOR WELDING CORRUGATED TUBES AND/OR COMPOUND TUBES AND WELD CONNECTION PRODUCED THEREBY

[75] Inventors: Hans-Werner Steinmetz, Schaffhausen; Dirk Alexander Petry, Feuerthalen, both of Switzerland

[73] Assignee: Georg Fischer Rohrleitungssysteme AG, Schaffhausen, Switzerland

[21] Appl. No.: 563,461

[22] Filed: Nov. 28, 1995

[30] Foreign Application Priority Data

Nov. 28, 1994 [CH] Switzerland ............. 03 581/94-8

[51] Int. Cl.⁶ .................................................. B31F 5/06
[52] U.S. Cl. .................. 156/158; 156/274.2; 156/293; 156/304.2; 156/304.3; 156/304.6; 285/21.1; 285/21.2; 285/903
[58] Field of Search ................. 156/158, 304.2, 156/304.3, 304.6, 273.9, 274.2, 275.1, 293; 285/21.1, 21.2, 903

[56] References Cited

U.S. PATENT DOCUMENTS

| | | | |
|---|---|---|---|
| 4,141,576 | 2/1979 | Lupke et al. | 285/369 |
| 4,266,997 | 5/1981 | Lippera | 156/158 |
| 4,702,502 | 10/1987 | Shade et al. | 285/903 X |
| 4,770,442 | 9/1988 | Sichler | 285/21.2 |
| 5,072,972 | 12/1991 | Justice | 285/903 X |
| 5,320,697 | 6/1994 | Hegler et al. | 156/304.2 X |
| 5,386,101 | 1/1995 | Steinmetz et al. | 156/304.2 |
| 5,458,380 | 10/1995 | Kanao | 285/903 X |
| 5,644,832 | 7/1997 | Kanao | 285/903 X |

FOREIGN PATENT DOCUMENTS

| | | |
|---|---|---|
| 0002959 | 7/1979 | European Pat. Off. . |
| 143282 | 1/1961 | U.S.S.R. . |
| WO 91/09247 | 6/1991 | WIPO ............. 285/21 |

Primary Examiner—Mark A. Osele
Attorney, Agent, or Firm—Bachman & LaPointe, P.C.

[57] ABSTRACT

In a process for the connecting of plastic tubes the wall of which has a corrugated cross section by electro-thermal welding, filling cores of plastic are inserted in the corrugation troughs of the tubes to be connected on both sides of a welding joint in order to form a resting surface on the outer circumference of the tubes and an electric heating mat which surrounds the resting surface of all filling cores is placed on the resting surface.

18 Claims, 2 Drawing Sheets

PROCESS AND MEANS FOR WELDING CORRUGATED TUBES AND/OR COMPOUND TUBES AND WELD CONNECTION PRODUCED THEREBY

BACKGROUND OF THE INVENTION

The present invention relates to a process for the welding of corrugated tubes and/or compound tubes of thermoplastic resin. The invention is furthermore directed at the use of this process in connection with tubes having a helically corrugated profile and the means for carrying out the process as well as to a weld connection produced thereby.

Corrugated tubes or compound tubes are acted on only by a slight pressure in certain fields of use, for instance when used as protective tubes for electric lines or as waste-water pipes. In that case, the connection need merely be fluid-tight. To produce a connection of corrugated tubes and/or compound tubes with known electric welding sockets would be very costly, particularly in the case of large tube cross sections.

In Federal Republic of Germany 43 07 704 a process is described in which the pipes are inserted with their free end into annular grooves of a welding socket which is arranged between them and are connected to it in customary manner by thermal welding. The width of the welding socket is very small as compared with the diameter of the pipe and the welding is effected only over a relatively short axial distance which, in the case of both the pipes, corresponds to the depth of the annular groove. Electric resistance of welding is furthermore made difficult by the fact that sufficient space is not available.

In the case of tubes which are traversed by fluid, there is furthermore the disadvantage that the inside part of the welding socket leads to a change in the inner cross section at the place of welding. In detail, it may furthermore be disadvantageous that, as a result of the interposed welding socket, the pitch of the corrugations at the place of connection is increased. The fact that tubes with a helically corrugated profile cannot be welded together or can be welded together only with a complicated development of the annular grooves, constitutes a serious disadvantage.

In Federal Republic of Germany 41 29 855, a process is described in which compound tubes or ribbed tubes are connected to each other. In that case, a welding ring is inserted between the tube ends and a socket is then pushed over both tubes. The socket serves for the centering of the pipes. An electric resistance heating is arranged on the welding ring. In this case also, only a small effective welding width is present and tubes having a helical profile cannot be welded together. Furthermore, both known processes can be used only for very special types of tubes.

The object of the present invention is to provide a process for the connecting of corrugated tubes and/or compound tubes which leads to a dependable weld connection and which can be used for any shape of tube and different tube dimensions.

SUMMARY OF THE INVENTION

This object is achieved, in accordance with claim 1, in the manner that filling cores of plastic are inserted into the corrugation troughs of the tubes to be connected on both sides of the place of connection in order to form a resting surface on the outer circumference of the tubes, and that an electric heating mat is placed on the resting surface of all the filling cores, surrounding them.

The essential advantage of the invention resides therein that for the connecting of the tubes, a simple electric heating mat with heating-wire winding can be used, which assures a uniform liberation of heat over the entire circumference and permits easy control of the welding temperature. The use of such a heating mat is made possible, in accordance with the invention, in the manner that the irregularities in the contour of the tubes, which result from the corrugated profile are smoothed out by the filling cores which form a uniform resting surface for the heating mat on the outer side. In this way, a full-surface heat transfer from the heating mat to the filling cores is assured. After the welding, a radially and axially firm connection of the tubes is present. The heating mat can easily be cut from an endless material to the desired size and the electric connections can be made on the spot. While welding sockets or welding rings, which as a rule are developed as injection moldings, must be produced in advance in accordance with the cross section of the tubes to be welded together and kept in stock, the invention does not require any especially developed part as welding aid. By the method of the invention, even corrugated tubes in which the corrugation profile is helical can easily be welded together. The strength of the weld connection can be easily adapted to the specific need by the axial length of the heating mat or the number of filling cores.

A variant of the process is characterized by the fact that a collar which positions the heating mat and the tubes at least during the welding is arranged on the mat.

With the collar, which as rigid part can be pushed in the form of a sleeve over the ends of the tubes or the heating mat, or as a tape wound thereon. The tube ends can be positioned in force-locked and/or form-locked manner for the welding process. Furthermore, by suitable pretensioning, it can serve to exert the required welding pressure. Differences in tolerance are also compensated for. Finally, cumbersome sockets or other aids for the welding process are done away with.

The collar can be removed after the welding and used again. Instead of this, it is, however, also possible to develop the collar from plastic and to weld it to the heating mat, forming an integral part of the connection.

In order to assure a gas-tight and/or liquid-tight connection, a further variant of the process is characterized by the fact that the filling cores are so developed and arranged in the corrugation troughs of the tubes to be connected that the outer surfaces of the filling cores remote from the axis of the tube lie in a common cylindrical surface with the tips of the undulation crests of the tubes.

In this process therefore, not only are the filling cores connected to each other via the heating mat, which already leads to an axially firm and radially firm connection, but the corrugation crests of the corrugated tube are included in the weld. Thus, the weld is also liquid-tight and gas-tight.

The heating wire winding of the heating mat is preferably so directed that the individual windings extend substantially in the longitudinal direction of the tubes.

In this way, not only is a uniform distribution of heat assured, but the heating mat is particularly flexible in circumferential direction and therefore adapts itself easily very small radii of curvature in the case of small tube diameters.

As already indicated, the process of the invention can be used, in particular, also in the case of plastic tubes having a helically corrugated profile. This is done particularly advantageously in the manner that the filling cores are developed by a single helix which, before the welding, is first of all wound completely on the end of one tube and, after positioning of the second tube, wound back partially upon the latter, bridging the place of connection.

The filling cores are therefore formed by a single part which can take up axial and radial forces. In this way, after winding of the helix on the threads of the tubes, the tube ends are correctly positioned, centered, and secured; in particular, it is possible to press the tube ends firmly against each other.

The invention furthermore proposes means for the carrying out of the process. These means consist of filling cores which can be inserted into the corrugation troughs of the tubes to be connected together on both sides of the place of connection, the cores forming a resting surface on the outside, and an electric heating mat which covers the resting surface of all filling cores, and possibly a collar which surrounds the heating mat.

In accordance with one embodiment, the filling cores can be developed as split rings which are inserted radially into the corrugation troughs and fixed in position by the heating mat which is then placed thereon.

In the case of tubes having a helically corrugated profile, the ring parts can be developed as parts of a helix, but they are preferably formed of a single helix.

The cross section of the filling cores advantageously corresponds approximately to the free cross section of the corrugation trough between two adjacent corrugation crests. The filling cores can therefore completely fill up this free cross section.

The heating mat preferably has a heating-wire winding the individual turns of which extend substantially in the lengthwise direction of the tubes so that it can easily be applied, regardless of the diameter of the tubes.

A weld connection produced by the process of the invention is characterized by filling cores which are inserted into the corrugation troughs of the pipes to be connected on both sides of the place of connection and which, on the circumference, form a resting surface which lies in a common cylindrical surface with the corrugation crests of the tubes and by an electric heating mat which covers the corrugation crests and the resting surfaces and is welded to them, and possibly a collar serving as positioning aid which surrounds the heating mat. The collar, insofar as it consists of a suitable plastic, can be welded to the heating mat and form an integral part of the connection.

In the case of tubes with a helically corrugated profile, the tube connection has a single helix as filling cores.

BRIEF DESCRIPTION OF THE DRAWINGS

Other advantageous features will become evident from the dependent claims and the following description of the embodiments, read with reference to the drawings, in which:

DETAILED DESCRIPTION

Figure 1:
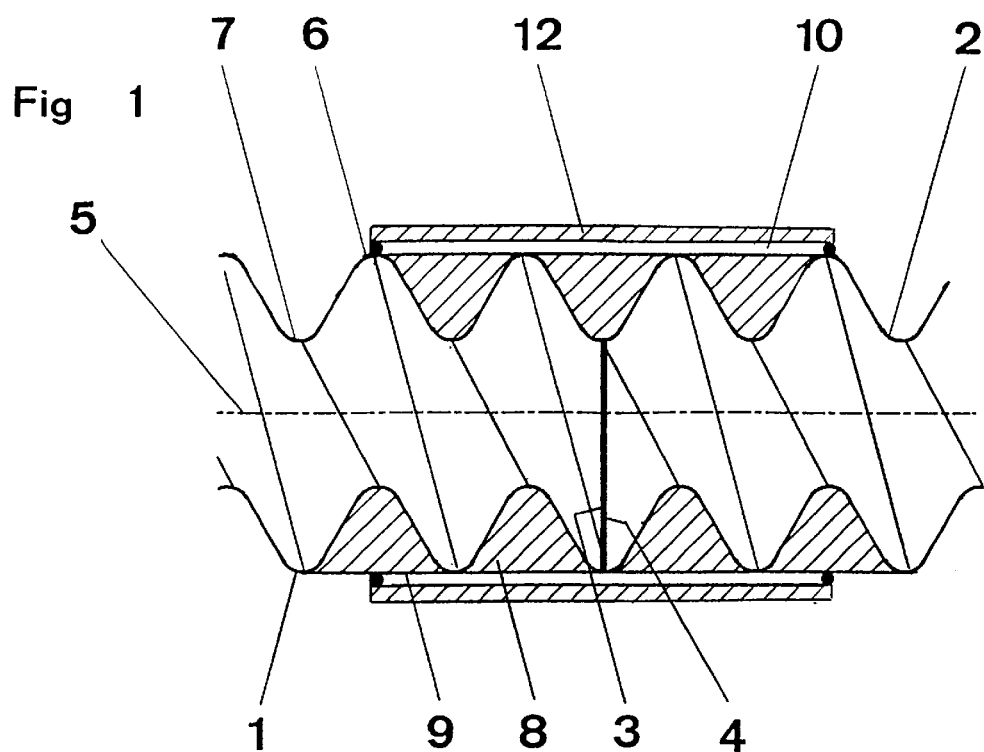
FIG. 1 shows a connection of two helically corrugated tubes.

FIG. 1 shows a connection of two helically corrugated tubes 1 and 2. As used herein, corrugated tubes means a tube which, when sectioned along its longitudinal axis, exhibits a corrugated like cross section of substantially sinusoidal configuration characterized by a plurality of troughs 7 of height h as measured from the base 6' to the crest 6 of the trough. The corrugated tubes 1 and 2 consist of weldable plastic. The corrugated tubes have on their circumference crests 6 and bases 6' which are arranged helically with respect to the longitudinal axis 5 of the tubes. Both tubes 1 and 2 have parting planes perpendicular to the longitudinal axis 5 of the tubes, each of these parting planes forming an end surface 3 and 4. The two corrugated tubes are held together against each other at their end surfaces 3 and 4 in abutting manner to form a welding joint. In this wave of troughs 7, rings are radially inserted as filling cores 8 in such a manner that an equal number of rings are arranged on the tubes 1 and 2 on both sides of the welding joint. Bodies 8 fill the volume of the troughs 7 up to the tips of the corrugation crests 6, that is, to height h. In this way, a closed resting surface 9 for a heating mat 10 is produced.

The filling cores 8 are either slit or divided in two, or are a part of a single helix in order to insert them into the troughs 7 or to be able to wind them on the helical thread of the tubes. They are made of a weldable plastic.

Figure 2:
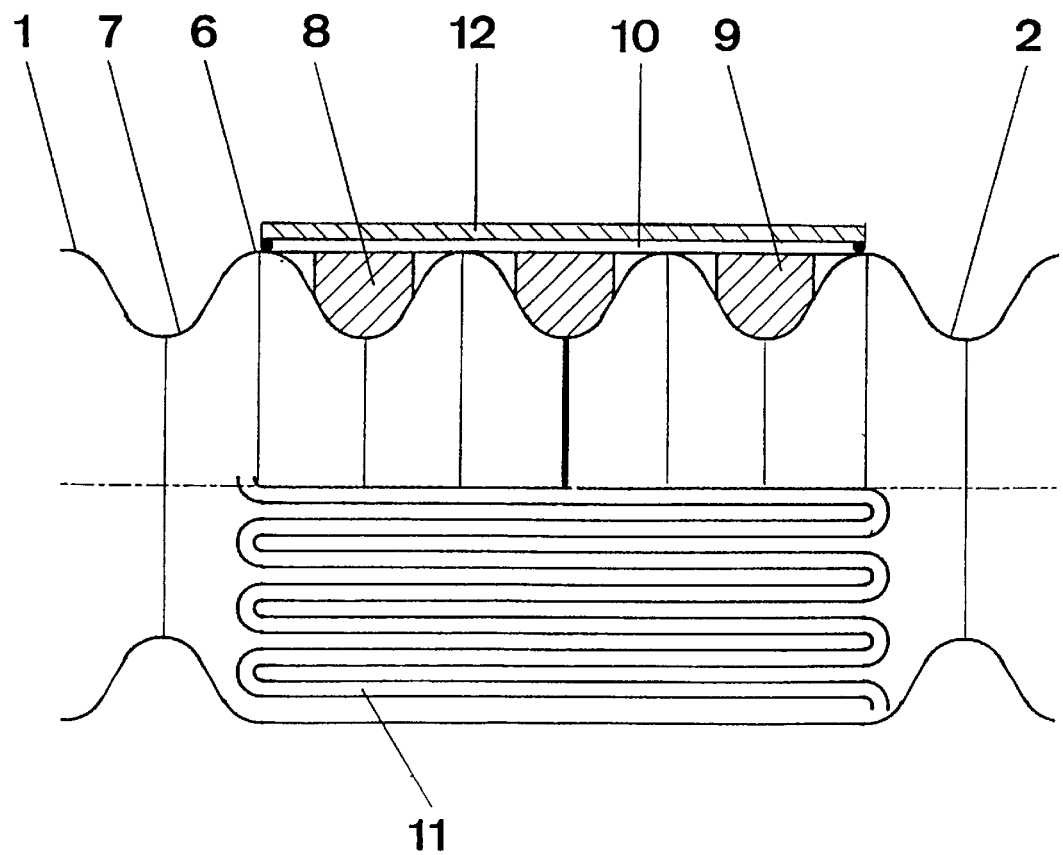
FIG. 2 shows a connection of two parallelly corrugated tubes, namely a longitudinal section at the top and a plan view at the bottom.

FIG. 2 shows a connection between two parallelly corrugated tubes 1 and 2. In this case also, filling cores 8 are inserted into the troughs 7 on the circumferential side so that, together with the peaks of the crests 6, they form a closed resting surface 9. Thereupon, a heating mat 10 is laid around the place of connection.

The heating mat 10 has an electric resistance wire 11 by means of which the filling cores 8 and the crests 6 are welded to the heating mat 10. The resistance wire is wound in a meandering path as strip or tape of any desired length. It is covered by a thermoplastic resin.

In order to produce the connection, the outside diameter of the tubes 1 and 2 is first of all determined. Thereupon a piece of the corresponding length is cut from an endless strip of heating mat. The strip or the heating mat is now placed around the circumference of the closed resting surface 9. The width of the heating mat may be of any size.

In order to apply sufficient welding pressure to the welding place and to hold both corrugated tubes 1 and 2 in position during the welding, a sleeve-shaped or strip-shaped collar 12 is placed over the heating mat 10. The collar 12 consists of a weldable plastic. It is welded to the heating mat 10 by said heating mat. The collar 12 can also consist of a metallic material. In that case, it is not welded to the mat. It is then developed in removable manner, consisting for instance of two axial half shells. It is also possible to fasten the collar by another removable safety band during the welding process.

By the meander-like development of the heating wire winding 11, the heating mat 10 is radially resilient. It is therefore pressed by the pressure of the collar 12 against the closed resting surface 9.

After connecting the heating mat 10 to a source of current, it is electrothermally welded to the peaks of the crests 6, the resting surface 9 of the filling cores 8, and possibly the collar 12 of thermoplastic resin.

The weld connection has a high tensile strength since the individual wires of the resistance heating lie in lengthwise direction. The resistance wire consists of copper, but it may also consist of some other material, for instance a resistance alloy. In this way, the tensile strength can be further increased.

Figure 3:
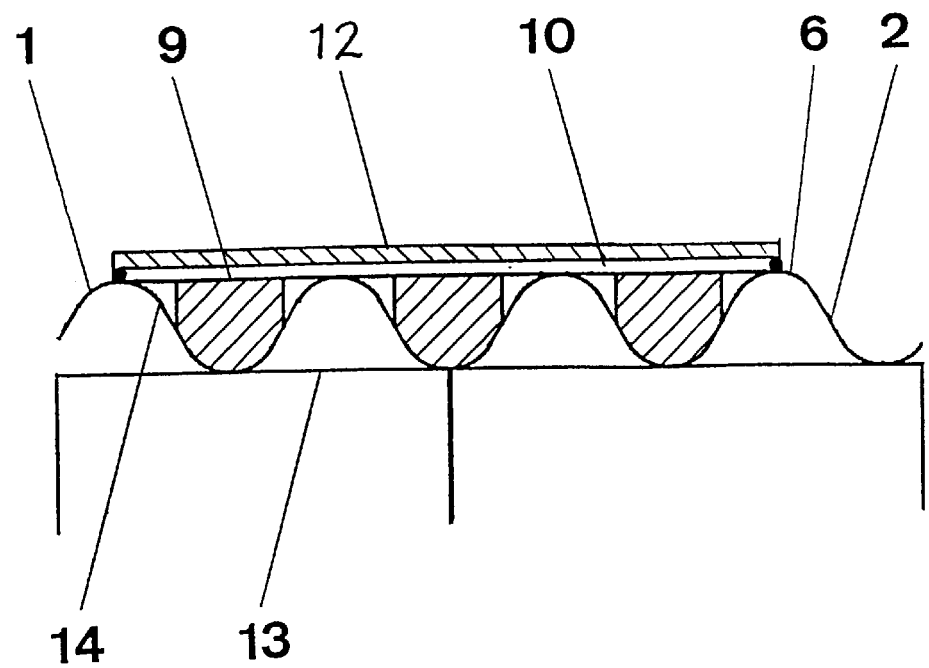
FIG. 3 shows a connection of two-layer compound tubes (corrugated tube with inner tube) in a half-longitudinal section.
Figure 4:
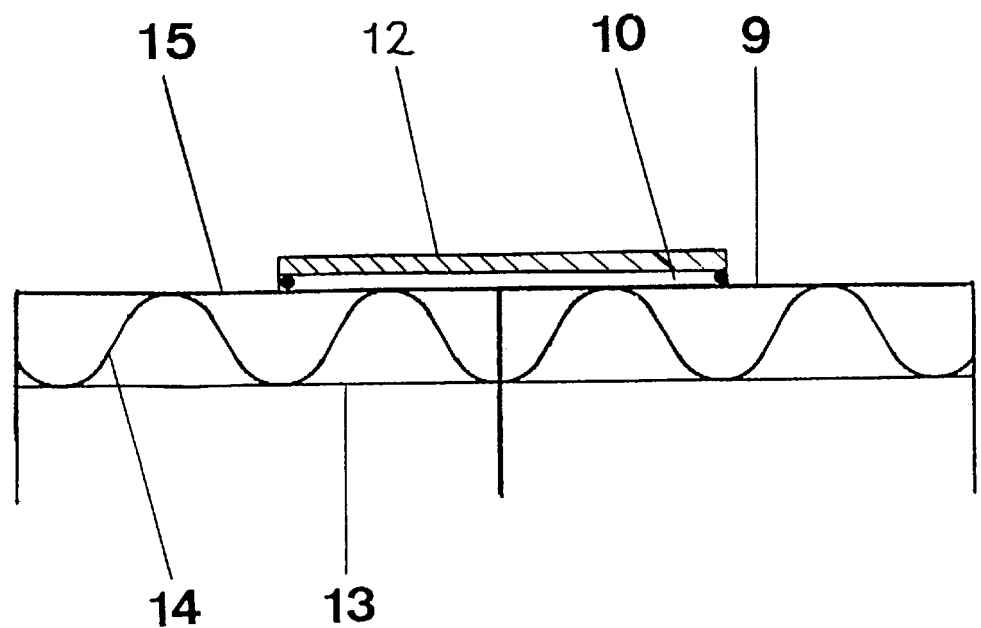
FIG. 4 shows a connection of three-layer compound tubes (corrugated tube with inner and outer tubes) in a half longitudinal section.

FIGS. 3 and 4 show further tube connections in the case of another embodiment of the tubes. FIG. 2 shows the ends of two two-layer compound tubes 1 and 2. The compound tubes 1 and 2 consist of a smooth inner tube 13 and a corrugated tube 14 which is firmly attached to it. In this case also, filling cores 8 are inserted so as, together with the tips of the crests 6, to obtain a closed resting surface 9 for a heating mat 10.

FIG. 4 shows a connection of two three-layer compound tubes 1 and 2. In this case, the corrugated tube 14 is firmly connected with a smooth inner tube 13 and a smooth outer tube 15. By the outer tube 15 a closed resting surface 9 for a heating mat 10 is always already present. Filling elements are not required with this type of compound tube for the welding together of the two tubes.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A process for welding corrugated plastic tubes characterized by a plurality of troughs of a height as measured from the base to the crest of the trough comprising the steps of:

locating two corrugated tubes along a longitudinal axis in abutting relationship to form a welding joint;

inserting filling cores of plastic material into the troughs of both corrugated tubes on either side of the welding joint wherein the filling cores fill the troughs to the said height so as to form with the crests a resting surface on the tubes;

locating a heating mat on the resting surface;

positioning a collar on the heating mat and the tubes for holding the heating mat during welding; and passing current through the heating mat to weld the tubes together at the welding joint.

2. A process according to claim 1 including the step of removing the collar after welding.

3. A process according to claim 2 wherein the collar consists of plastic and is welded to the heating mat thereby forming an integral part of the connection.

4. A process according to claim 1 wherein the filling cores are arranged in the troughs of the tubes such that the outer surfaces of the filling cores remote from the longitudinal axis lie in a common plane with the crests of the tubes.

5. A process according to claim 1 including the steps of inserting the filling cores in at least each of two adjacent troughs on either side of the welding joint.

6. A process according to claim 1 including the steps of arranging a heating wire winding in the heating mat such that individual windings extend substantially in the lengthwise direction of the tubes.

7. A process according to claim 1 wherein the plastic tubes have a helically corrugated profile.

8. An apparatus for welding corrugated plastic tubes characterized by a plurality of troughs of a height as measured from the base to the crest of the trough comprising: filling core means configured for insertion into the troughs of the tubes to be connected, said cores forming with the crests of the troughs a resting surface and an electric heating mat which covers the resting surfaces of all filling cores, wherein a collar surrounds the heating mat and positions it and the tubes to be connected during welding.

9. An apparatus according to claim 8 wherein the collar is arranged in detachable manner.

10. An apparatus according to claim 8 wherein the collar consists of plastic and is welded to the heating mat during welding.

11. An apparatus according to claim 8 wherein the resting surface formed by the filling cores and the crests lie in a common cylindrical surface.

12. An apparatus according to claim 8 wherein the filling cores are formed as split rings.

13. An apparatus according to claim 12 wherein the ring parts are formed as part of a helix.

14. An apparatus according to claim 12 wherein the filling cores are formed by a single helix.

15. An apparatus according to claim 12 wherein the filling cores have a cross section which corresponds approximately to the free cross section of the troughs.

16. An apparatus according to claim 8 wherein the heating mat has a heating wire winding wherein the individual windings extend substantially in the lengthwise direction of the tubes.

17. A weld connection on plastic tubes characterized by a plurality of troughs of a height as measured from the base to the crest of the trough comprises filling cores inserted into the troughs of the tubes to be connected on both sides of a welding joint wherein the cores form a resting surface with the crests of the troughs of the tubes, and an electric heating mat which surrounds the crests and the resting surface and is welded to them. and wherein the heating mat is surrounded by a collar of plastic which serves as a positioning aid for and is welded to the mat.

18. A weld connection according to claim 17 wherein the tubes have a helically corrugated profile and the filling cores consist of a single helix.

* * * * *